(12) United States Patent
Jensen

(10) Patent No.: US 7,092,354 B2
(45) Date of Patent: Aug. 15, 2006

(54) METHOD AND APPARATUS TO PROVIDE REDUNDANCY IN A NETWORK

(75) Inventor: Kell Michael Jensen, Gentofte (DK)

(73) Assignee: Intel Corporation, Santa Clara, CA (US)

( * ) Notice: Subject to any disclaimer, the term of this patent is extended or adjusted under 35 U.S.C. 154(b) by 793 days.

(21) Appl. No.: 09/878,081

(22) Filed: Jun. 7, 2001

(65) Prior Publication Data

US 2002/0186653 A1 Dec. 12, 2002

(51) Int. Cl.
*G01R 31/08* (2006.01)

(52) U.S. Cl. ............... 370/218; 370/220; 370/400

(58) Field of Classification Search ............. 370/217, 370/218, 219, 220, 242, 244, 389, 400, 402; 714/1, 2
See application file for complete search history.

(56) References Cited

U.S. PATENT DOCUMENTS

| | | | | |
|---|---|---|---|---|
| 5,473,599 A | * | 12/1995 | Li et al. | 370/219 |
| 5,835,696 A | * | 11/1998 | Hess | 714/10 |
| 5,982,745 A | * | 11/1999 | Wolff et al. | 370/219 |
| 6,195,351 B1 | * | 2/2001 | Hiscock et al. | 370/389 |
| 6,885,667 B1 | * | 4/2005 | Wilson | 370/392 |
| 6,954,436 B1 | * | 10/2005 | Yip et al. | 370/254 |

* cited by examiner

*Primary Examiner*—Bob A. Phunkulh
(74) *Attorney, Agent, or Firm*—Kacvinsky LLC

(57) ABSTRACT

A method and apparatus to provide redundancy in a network is described.

18 Claims, 3 Drawing Sheets

METHOD AND APPARATUS TO PROVIDE REDUNDANCY IN A NETWORK

BACKGROUND

A network typically comprises a number of network nodes connected together by communications media. Information is passed from one network node to another from a source until it arrives at an intended destination. The series of nodes and communications media between a source and destination may be collectively referred to as a "path." From time to time, a node may go down in a given path, and an alternate or redundant path is required to communicate the information. Conventional solutions, however, may require expensive hardware or software to provide the alternate path. Furthermore, conventional solutions may be relatively complex thereby increasing difficulty and cost in implementing the technology for a particular network. Consequently, there may exist a substantial need for a method and apparatus to provide redundancy in a network while reducing the cost and/or complexity of the network.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
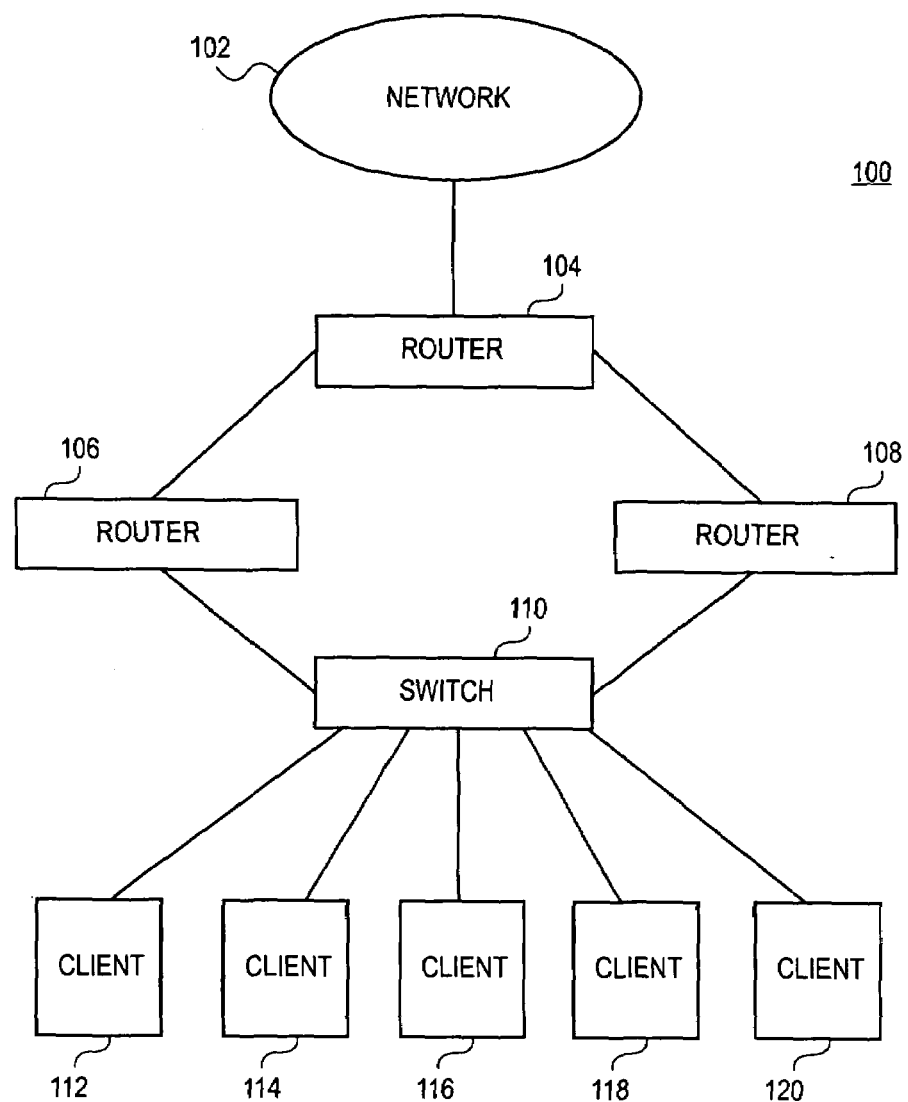
FIG. 1 is a system suitable for practicing one embodiment of the invention.

In the following detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention.

One embodiment of the invention comprises a method and apparatus to provide redundancy in a network. A network may comprise a number of network nodes connected by communications media. In one embodiment of the invention, a network node may comprise, for example, a router, switch, gateway, bridge, server, storage area network (SAN), load balancer, network appliance, personal computer (PC) and so forth. The network node is typically configured with communication hardware and software that may allow the node to communicate over the communications media with other nodes in the network. A connection between network nodes may sometimes be referred to as a "link." A source network node may comprise a network node that is communicating information to another network node. A destination network node may comprise a network node that is receiving information from the source network node. An intermediate network node may comprise a network node that passes information from the source node to another intermediate node, or the destination node.

In one embodiment of the invention, some communication paths in a network may carry information having a higher priority than other paths. The information may be important enough that technologies are required to make some paths redundant, that is, to ensure that if a node or link in the path goes down, that there is an alternate node or link, respectively, available to carry the information. Conventional redundant technologies, however, may require additional hardware or software that increases the overall cost of the network. In addition, some of these technologies may not be fast enough to switch to the alternate communication path in a timely fashion. Accordingly, it can be appreciated that a substantial need may exist for redundant technologies that provide alternative communication paths in a faster, more efficient manner.

One example of a conventional technology that may provide redundancy in a network includes the Virtual Router Redundancy Protocol (VRRP). The VRRP is an election protocol that dynamically assigns responsibility for one or more virtual router(s) to a VRRP configured router on a network, allowing several routers on a multi-access link to utilize the same virtual Internet Protocol (IP) address. A VRRP router is configured to run the VRRP in conjunction with one or more other routers attached to a network, such as a local area network (LAN). In a VRRP system, one router may be elected as the master router with the other routers acting as backups in case of the failure of the master router. A VRRP system, however, may be difficult and expensive to set up. For example, each router participating in the VRRP must be configured with special software and/or hardware. Consequently, each additional VRRP router may add to the overall system cost and administrative requirements.

One embodiment of the invention may provide redundancy in a network without the disadvantages associated with conventional systems, such as a VRRP system. This may be accomplished by sending routing information to both an active network node and one or more standby network nodes. In this manner the standby network node may have the same routing information as the active network node. The active network node may periodically send a control message to the standby network node. The control message may inform the standby network node that the active network node is active or in operation. If the standby network node fails to receive the control message within a given time interval, however, the standby network node may assume that the active network node has failed or is out-of-service. In this case, the standby network node may send a control message to those network nodes that are in communication with the active network node to redirect traffic from the active network node to the standby network node. The control message may contain, for example, a network address for the active network node thereby forcing connected network nodes to reconfigure routing information to point to the standby network node. The network address may comprise, for example, a medium access control (MAC) network address.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a network 102, a router 104, a router 106, a router 108, a switch 110, and clients 112, 114, 116, 118 and 120. Each of these components may comprise a network node configured to communicate information in the form of packets to other nodes in system 100. Although a certain number of network nodes have been illustrated as part of system 100, it can be appreciated that any number of network nodes may be implemented as part of system 100 and still fall within the scope of the invention.

In operation, system 100 may communication information in the form of packets from network 102 to router 104. A packet may be referred to herein as a discrete amount of information, typically represented in the form of bits or bytes per packet. Router 104 may route the packets to switch 110 through router 106 or router 108. In this embodiment of the invention, router 104 may route packets to switch 110 through router 106, for example. In this embodiment of the invention, router 106 may be considered an active router. The term "active router" as used herein may refer to a network node that is primarily responsible for routing information between two points. In this embodiment of the invention, router 108 may operate as a standby router, for example. The term "standby router" as used herein may refer to a network node that operates as part of an alternate path to route information between two points if the active router fails. Switch 110 may then route the packets to one or more clients 112, 114, 116, 118 or 120.

Figure 2:
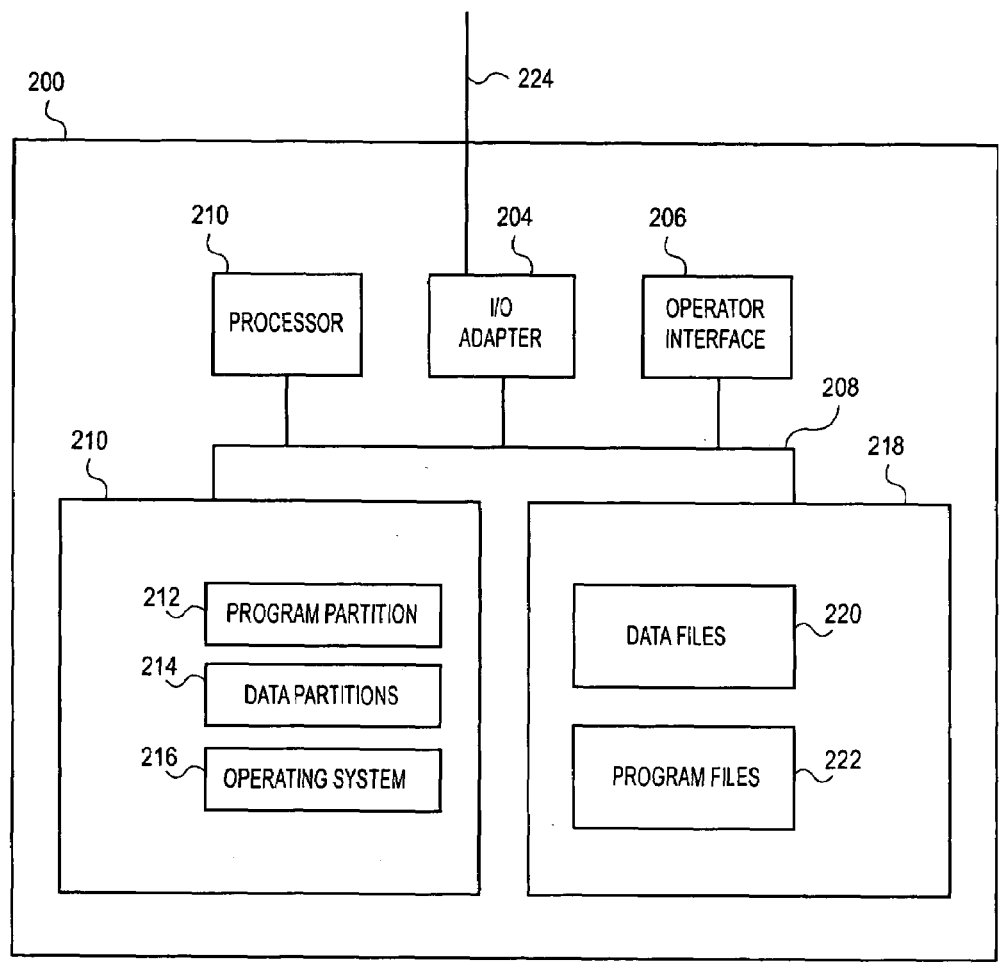
FIG. 2 is a block diagram of a computer system in accordance with one embodiment of the invention.

FIG. 2 is a block diagram of a network node in accordance with one embodiment of the invention. FIG. 2 illustrates a network node 200 that may be representative of any network node in system 100, including active router 106 and standby router 108. As shown in FIG. 2, system 200 includes a processor 202, an input/output (I/O) adapter 204, an operator interface 206, a memory 210 and a disk storage 218. Memory 210 may store computer program instructions and data. The term "program instructions" may include computer code segments comprising words, values and symbols from a predefined computer language that, when placed in combination according to a predefined manner or syntax, cause a processor to perform a certain function. Examples of a computer language may include C, C++, JAVA and assembly. Processor 202 executes the program instructions, and processes the data, stored in memory 210. Disk storage 218 stores data to be transferred to and from memory 210. I/O adapter 204 communicates with other devices and transfers data in and out of the computer system over connection 224. Operator interface 206 may interface with a system operator by accepting commands and providing status information. All these elements are interconnected by bus 208, which allows data to be intercommunicated between the elements. I/O adapter 204 represents one or more I/O adapters or network interfaces that can connect to local or wide area networks such as, for example, the network described in FIG. 1. Therefore, connection 224 may represents a network or a direct connection to other equipment.

Processor 202 can be any type of processor capable of providing the speed and functionality required by the embodiments of the invention. For example, processor 202 could be a processor from family of processors made by Intel Corporation, Motorola Incorporated, Sun Microsystems Incorporated, Compaq Computer Corporation and others. Processor 202 may also comprise a digital signal processor (DSP) and accompanying architecture, such as a DSP from Texas Instruments Incorporated.

In one embodiment of the invention, memory 210 and disk storage 218 may comprise a machine-readable medium and may include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM) and any other media that may store digital information. In one embodiment of the invention, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, client 200 may contain various combinations of machine-readable storage devices through various I/O controllers, which are accessible by processor 202 and which are capable of storing a combination of computer program instructions and data.

Memory 210 is accessible by processor 202 over bus 208 and includes an operating system 216, a program partition 212 and a data partition 214. In one embodiment of the invention, operating system 216 may comprise an operating system sold by Microsoft Corporation, such as Microsoft Windows® 95, 98, 2000 and NT, for example. Program partition 212 stores and allows execution by processor 202 of program instructions that implement the functions of each respective system described herein. Data partition 214 is accessible by processor 202 and stores data used during the execution of program instructions.

In one embodiment of the invention, program partition 212 contains program instructions that will be collectively referred to herein as a mirroring module. This module may perform the functions for both the active router and the standby router, to ensure that the standby router may monitor for failure of the active router, and take over the functions of the active router if the active router fails. The active router may fail for any number of reasons, such as power outages, hardware or software failure, severing of a link between the active router and another network node, and so forth. Of course, the scope of the invention is not limited to this particular set of instructions.

I/O adapter 204 may comprise a network adapter or network interface card (NIC) configured to operate with any suitable technique for controlling communication signals between computer or network devices using a desired set of communications protocols, services and operating procedures, for example. In one embodiment of the invention, I/O adapter 204 may operate, for example, in accordance with the Transmission Control Protocol (TCP) as defined by the Internet Engineering Task Force (IETF) standard 7, Request For Comment (RFC) 793, adopted in September, 1981, and the Internet Protocol (IP) as defined by the IETF standard 5, RFC 791, adopted in September, 1981, both available from "www.ietf.org." Although I/O adapter 204 may operate with in accordance with the above described protocols, it can be appreciated that I/O adapter 204 may operate with any suitable technique for controlling communication signals between computer or network devices using a desired set of communications protocols, services and operating procedures, for example, and still fall within the scope of the invention.

I/O adapter 204 also includes appropriate connectors for connecting I/O adapter 204 with a suitable communications medium. I/O adapter 204 may receive communication signals over any suitable medium such as copper leads, twisted-pair wire, co-axial cable, fiber optics, radio frequencies, and so forth.

The operation of systems 100 and 200 may be further described with reference to FIG. 3 and accompanying examples. Although FIG. 3 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 3:
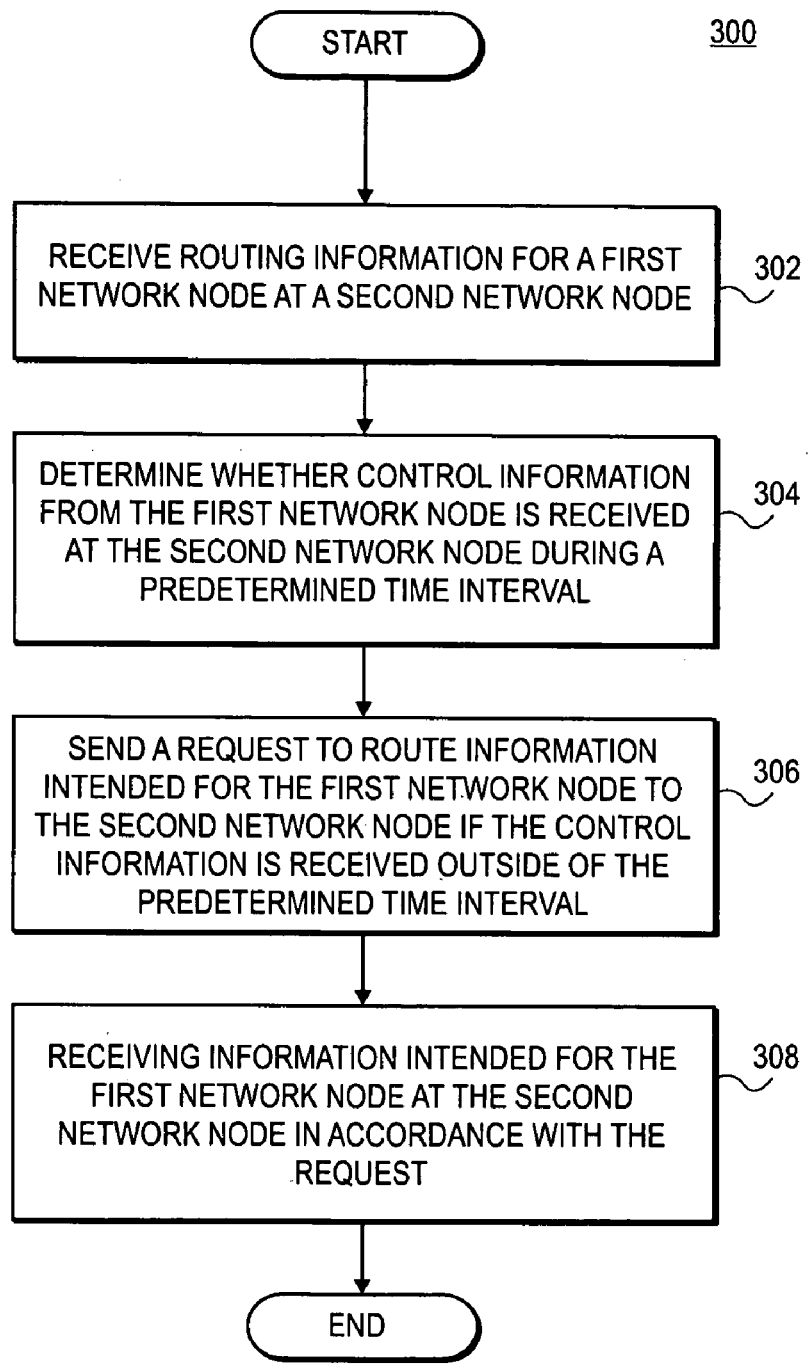
FIG. 3 is a block flow diagram of operations performed by a mirroring module in accordance with one embodiment of the invention.

FIG. 3 is a block flow diagram of the programming logic performed by a mirroring module in accordance with one embodiment of the invention. The term "mirroring module" as used herein may refer to the software and/or hardware used to implement the functionality for the active or standby router as described herein. In this embodiment of the invention, the mirroring module may be implemented as part of active router 106 and/or standby router 108. It can be appreciated that this functionality, however, can be implemented by any device, or combination of devices, located anywhere in a communication network and still fall within the scope of the invention.

FIG. 3 illustrates a programming logic 300. As shown in FIG. 3, a second network node may receive routing information for a first network node at block 302. The second network node may determine whether it receives control information from the first network node during a predetermined time interval at block 304. The second network node may send a request to route information intended for the first network node to the second network node if the control information is received outside of the predetermined time interval at block 306. The second network node may then receive information intended for the first network node at the second network node in accordance with the request at block 308.

In one embodiment of the invention, the request sent at block 306 may include a network address for the first network node. Further, the network address may comprise a MAC address. In addition, the first network node may comprise an active router, and the second network node may comprise a standby router.

Once the standby router takes over for the active router, the active router may come back into service. In this case, the second network node may begin to receive control information from the first network node. Once the second network node receives the control information, the second network node may send a request to route information intended for the second network node back to the first network node.

The operation of system 100 and the flow diagram shown in FIG. 3 can be better understood by way of example. A network such as system 100 may comprise alternate paths to reach an intended destination. For example, information passed from network 102 to router 104 may be intended for a client such as client 120. Router 104 may send the information to switch 110 using router 106 and appropriate links, or router 108 and appropriate links. In one example, the path through router 106 may be more cost efficient or faster than the path through router 108. Therefore, router 104 may have a routing table that forwards information to switch 110 through router 106. If router 106 were to fail, or if one of the links between router 106 and router 104 or switch 110, respectively, were to fail, however, it may be desirable to route the information from router 104 to switch 110 through an alternate path. One possible alternate path may comprise router 108 and its accompanying links.

Consequently, in this example router 106 may be considered an active router and router 108 may be considered a standby router. This could be accomplished by configuring both router 106 and router 108 in accordance with the VRRP. One embodiment of the invention, however, may avoid this time consuming and potentially expensive alternative. In one embodiment of the invention, router 106 may be designated as an active router and router 108 as a standby router. Routing information required to update the routing table for router 106 would also be sent to router 108. In other words, the mirroring module of router 108 may be configured to monitor for packets of control information containing routing information for router 106. Alternatively, router 106 or router 104 could have a mirroring module that is configured to periodically send routing information updates to router 108. Router 108 would update its routing table to reflect this received routing information, thereby making sure that it has a routing table matching router 106.

Router 108 may monitor the performance of router 106 in various ways. In one embodiment of the invention, router 108 may be configured to intercept or receive control information from router 106 or router 104. The control information may comprise, for example, routing control frames, dedicated control frames, or some other kind of specialized packet frames appropriate to monitor performance of router 106. Router 108 may be configured to determine whether it has received the control information for router 106 during a predetermined time interval. The time interval may vary according to the amount of latency system 100 may tolerate in the event of a failure of router 106. For example, if the maximum amount of time system 100 may tolerate a failure of router 106 is one minute, then the control frames may be sent to router 108 in a time interval less than one minute, such as every thirty to forty-five seconds. If router 108 receives the control information outside of the predetermined time interval, or fails to receive the control information within the predetermined time interval, router 108 may assume that router 106 has failed. The mirroring module of router 108 may then initiate the sequence of instructions to begin assuming the operations of router 106.

Once router 108 has determined that router 106 has failed, router 108 may take over operations for router 106. Since router 108 has been periodically receiving routing information for router 106, the routing table of router 108 should have substantially the same routing information as the routing table for router 106. Router 108 may inform the network nodes sending information to router 106, such as router 104, to begin sending that information intended for router 106 to router 108. This may be accomplished by sending a request to router 104 to reroute information to router 108. The request may include a network address for router 106, such as the MAC address. Once router 104 receives the request with the MAC address for router 106 on a port that is assigned to router 108 rather than the port assigned to router 106, router 104 may initiate a predefined subroutine that changes the port assigned to router 106 to the port assigned to router 108. This predefined subroutine may be referred to herein as a "MAC relearn on new port" command. This command may modify the routing table of router 104 to reflect the new port assignment for router 106. When a packet for router 106 is received at router 104, router 104 may check its routing table for the appropriate port number for router 106, and will find the new port number that represents the link to router 108. Consequently, information intended for router 106 may be re-routed to router 108 with only one change in the routing table for router 104, for example.

Once router 104 has changed its routing table to reflect that information for router 106 is to be sent to router 108, router 108 may take over the operations of router 106 and will now act as the new active router for system 100. Router 108 will receive information from router 104 and route to switch 110 to replace the failed path containing router 106.

At some point, router 106 or its links may be repaired and come back on line. In this case, router 106 may send out control information to router 108 indicating it is back in service. Router 108 may then send a request to route information intended for router 108 to router 106. Router 104 may receive the request, and modify its routing table to reflect the correct port number for router 106. Router 104 may then begin routing information intended for router 106 back to router 106, and router 106 may once again become the active router. Router 108 would then revert to the standby router and continue to monitor operations of router 106.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to provide redundant communications in a network, comprising:
   receiving routing information intended for a first network node at said first network node and at a second network node, wherein said first network node remains active;
   determining whether control information from said first network node is received at said second network node during a predetermined time interval;
   sending a request to a third network node to route information intended for said first network node to said second network node if said control information is received outside of said predetermined time interval, said request to include a network address for said first network node to cause said third network node to reconfigure routing information to point to said second network node; and
   receiving information intended for said first network node at said second network node in accordance with said request.

2. The method of claim 1, wherein said network address is a medium access control (MAC) address.

3. The method of claim 1, further comprising:
   receiving said control information from said first network node at said second network node; and
   sending a request to route information intended for said second network node to said first network node.

4. The method of claim 1, wherein said first network node is an active router, and said second network node is a standby router.

5. A method to provide redundant communications in a network, comprising:
   receiving routing information intended for an active router at said active router and at a standby router, wherein said active router remains active;
   receiving a control packet from said active router at said standby router at a predetermined time interval;
   determining whether said control packet is received within said predetermined time interval; and
   sending a request to at least one router sending information to said active router to route information intended for said active router to said standby router in accordance with said determination, said request to include a network address for said active router to cause said at least one router to reconfigure routing information to point to said standby router.

6. The method of claim 5, further comprising receiving information intended for said active router at said standby router in accordance with said request.

7. The method of claim 5, wherein said network address is a medium access control (MAC) address.

8. The method of claim 5, further comprising:
   receiving said control packet from said active router at said standby router; and
   sending a request to route information intended for said standby router to said active router.

9. An article comprising:
   a storage medium;
   said storage medium including stored instructions that, when executed by a processor, result in a method to provide redundant communications in a network by receiving routing information intended for a first network node at said first network node and at a second network node, wherein said first network node remains active, determining whether control information from said first network node is received at said second network node during a predetermined time interval, sending a request to a third network node to route information intended for said first network node to said second network node if said control information is received outside of said predetermined time interval, said request to include a network address for said first network node to cause said third network node to reconfigure routing information to point to said second network node, and receiving information intended for said first network node at said second network node in accordance with said request.

10. The article of claim 9, wherein the stored instructions, when executed by a processor, further result in said request including a network address comprising a medium access control (MAC) address.

11. The article of claim 9, wherein the stored instructions, when executed by a processor, further result in receiving said control information from said first network node at said second network node, and sending a request to route information intended for said second network node to said first network node.

12. An article comprising:
   a storage medium;
   said storage medium including stored instructions that, when executed by a processor, result in a method to provide redundant communications in a network by receiving routing information intended for an active router at said active router and at a standby router, wherein said active router remains active, receiving a control packet from said active router at said standby router at a predetermined time interval, determining whether said control packer is received within said predetermined time interval, and sending a request to at least one router sending information to said active router to route information intended for said active router to said standby router in accordance with said determination, said request to include a network address for said active router to cause said at least one router to reconfigure routing information to point to said standby router.

13. The article of claim 12, wherein the stored instructions, when executed by a processor, further result in receiving said control packet from said active router at said standby router, and sending a request to route information intended for said standby router to said active router.

14. An apparatus to provide redundant communications in a network, comprising:

a standby router to receive routing information intended for said active router and received by said active router, wherein said active router remains active; and said standby router to include a mirroring module to receive a control packet from said active router at a predetermined time interval, determine whether said control packet is received within said predetermined time interval, and send a request to at least one router sending information to said active router to route information intended for said active router to said standby router in accordance with said determination, said request to include a network address for said active router to cause said at least one router to reconfigure routing information to point to said standby router.

15. The apparatus of claim 14, said standby router to receive information intended for said active router in accordance with said request.

16. The apparatus of claim 14, wherein said network address is a medium access control (MAC) address.

17. The apparatus of claim 14, said standby router to receive said control packet from said active router, and send a request to route information intended for said standby router to said active router.

18. The apparatus of claim 14, said standby router comprising:

a network adapter to communicate said routing information and control packets; and a wired communications medium to couple to said network adapter.

* * * * *

UNITED STATES PATENT AND TRADEMARK OFFICE
CERTIFICATE OF CORRECTION

PATENT NO. : 7,092,354 B2 Page 1 of 1
APPLICATION NO. : 09/878081
DATED : August 15, 2006
INVENTOR(S) : Jensen It is certified that error appears in the above-identified patent and that said Letters Patent is hereby corrected as shown below:

In column 8, line 62, in Claim 12, delete "packer" and insert -- packet --, therefor.

Signed and Sealed this

Second Day of October, 2007

JON W. DUDAS
*Director of the United States Patent and Trademark Office*